Patented May 2, 1944

2,348,079

UNITED STATES PATENT OFFICE 2,348,079

FUR SUBSTITUTE AND FELT HAT MATERIAL

Sigmund Lichtenthal, Norwalk, Conn., assignor to said Sigmund Lichtenthal and J. E. Hassan, Norwalk, Conn., a partnership No Drawing. Application March 19, 1942, Serial No. 435,390

10 Claims. (Cl. 19—146)

This invention relates to material for making felt hats, particularly to a fur substitute or material to be mixed with good fur for felt hats, and has for an object to provide such a material to reduce the cost of the hat but still make a good hat which compares favorably in strength of material, feel, appearance and other qualities with normal fur felt hats.

Other objects and advantages will appear from the following description. It is, however, to be understood that the invention is not limited to the exact materials or proportions described, but may involve various changes and modifications within the scope of the invention.

Due to world conditions the available supply of good fur for felt hats, particularly rabbit fur, is greatly reduced as most of it is imported from Australia and Europe, but I have discovered that a very satisfactory substitute material for a portion of the fur ordinarily used can be produced by mixing the barbs of feathers with hat materials such as that known as short stock to form a base or substitute material. This can be mixed in proper quantities with good cut carroted fur stock to form a felting mixture which is used for manufacturing the hat.

In preparing the material, feathers are cleaned by removing the heavy stems or shafts, leaving the barbs, and cutting the remainder to the length of the usual fiber desired for making hats. Then this material is carroted with any of the usual fur carrots employed in the manufacture of hats and then dried, the carroting of course being to open up the barbs or fibers to increase the felting properties. Then this dried material is mixed with what is known as short stock material used in making hats, the preferred proportions being about fifty percent of the carroted feathers and fifty percent of the short stock, although these proportions may be varied somewhat. This mixture is the base mixture or fur substitute. The short stock is usually poor fur, casein and other materials now used with fur in certain proportions in making felt hats. Any short stock may be used, whether it includes roundings and so forth. It is ordinarily not carroted. Short stock is known throughout the trade as a filler stock having no felting qualities and so cannot by itself be made into a hat. As is well known, it is made from various by-products in the hatting industry, such as chopped pieces of fur, the boiled fur from legs, ears and tails of the animals and other uncarroted waste furs. As indicated, the proportions may be varied, using less of the feathers if desired depending on the price and other considerations. Up to fifty percent of the carroted feathers can be used and still secure a hat which compares very favorably with an all fur hat. That is, up to these proportions for normal use gives a mixture practically as good as the ordinary hat mixture and produces a hat with practically as good feel, strength, appearance and other qualities, but of course any percentage less than this may be used depending on price and other considerations.

These materials are blown and mixed to give the base mixture, and it has very little felting qualities. That is, it will not of itself felt sufficiently to make hats, but will felt with other materials such as normal hat fur stock which is capable of felting alone. It is therefore mixed with good fur material or hat stock which would felt alone, generally known as cut-carroted fur stock. This base mixture will felt with the other material for making felt hats in the usual processing of forming, dyeing, hardening, sizing, pouncing, and so forth. The amount of the base material mixed with the good fur material or hat stock depends upon the quality and price of the hat desired. It can be used up to about seventy-five percent with twenty-five percent of any of the good fur stock that will felt alone, but it is preferred not to use above about seventy percent of the base material with about thirty percent of the good fur material or hat stock. This material gives a very good quality of felt material for making the hat which compares very favorably with the usual fur felt hats. It has as good feel as the normal fur felt hats, and it acts in the forming, hardening, sizing, pouncing and other operations more nearly like normal fur stock than other substitute materials of which I am aware. In short, its ability of felting, shrinking and so forth compares very favorably with normal fur stock in hat processing. Lesser proportions of the base material may be used, that is, the base material may be used up to about seventy-five percent depending of course on the quality desired, but as stated, about seventy percent of the base material with about thirty percent of the good hat material or fur stock makes a very satisfactory hat.

In other words, the final hat stock is a mixture of the base material, which will not felt alone, and good hat stock or material which would felt alone, with the preferred proportions of about seventy percent of the base mixture and about thirty percent of good hat stock, giving a stock which will felt satisfactory in the hat processing operations. As indicated, it is of course not confined to these proportions, but it is desired to use as much of the poor or base mixture as possible and still give a satisfactory quality hat, and this can be done with the proportions stated. This gives a material for making felt hats with the usual processing of forming, dyeing, hardening, sizing, pouncing and so forth, and produces a hat which feels and looks practically as good as the normal fur felt hat and has as good strength, but can be made at much less cost and uses much less of the high-priced fur and fur which is difficult to obtain under present conditions.

Having thus set forth the nature of my invention, I claim:

1. A felting material for hats comprising a base mixture of short stock fur and the dry, carroted barbs of feathers, mixed with fur hat stock capable of felting alone.

2. A felting material for hats comprising a base mixture of short stock fur and the dry, carroted barbs of feathers, mixed with fur hat stock capable of felting alone, the percentage of the base mixture varying up to about seventy-five percent of the material, and the fur hat stock forming the balance.

3. A felting material for hats comprising a mixture of cleaned feathers with the heavy stems or shafts removed and cut to length and carroted, short stock fur, and cut carroted fur stock.

4. A felting material for hats comprising a base mixture of about fifty percent short stock fur and about fifty percent of dry carroted barbs of feathers, and said base mixture being mixed with cut carroted fur stock, the percentage of the base mixture varying up to about seventy-five percent of the material with the fur stock forming the balance.

5. A felting material for hats comprising a base mixture of about fifty percent short stock fur and about fifty percent of dry, carroted cut feathers from which the heavy stems or shafts have been removed, and cut carroted fur stock, the base mixture being about seventy percent of the material with the fur stock forming about thirty percent.

6. A base material for felt hats comprising a mixture of cleaned feathers with the heavy stems or shafts removed and cut to length and carroted, and short stock comprising poor fur and other materials, said base material being non-felting per se but capable of felting when mixed with feltable fur hat stock.

7. A base material for felt hats comprising short stock comprising poor fur and other materials mixed with dry, carroted, cut feathers from which the heavy stems or shafts have been removed, said base material being non-felting per se but capable of felting when mixed with feltable fur hat stock.

8. A base material for felt hats comprising the dry, carroted barbs of feathers mixed with short stock comprising poor fur and other materials, said base material being nonfelting per se but capable of felting when mixed with feltable fur hat stock.

9. A base material for felt hats comprising a mixture of about 50% of short stock comprising poor fur and other materials and about 50% of the dry, carroted barbs of feathers, said base material being nonfelting per se but capable of felting when mixed with feltable fur hat stock.

10. A base material for felt hats comprising about 50% of short stock comprising poor fur and other materials and about 50% of dry, carroted, cut feathers from which the heavy stems or shafts have been removed, said base material being nonfelting per se but capable of felting when mixed with feltable fur hat stock.

SIGMUND LICHTENTHAL.